June 26, 1951 E. F. DIEKHOFF 2,558,610
CONTROL DEVICE
Filed June 7, 1947 2 Sheets-Sheet 1
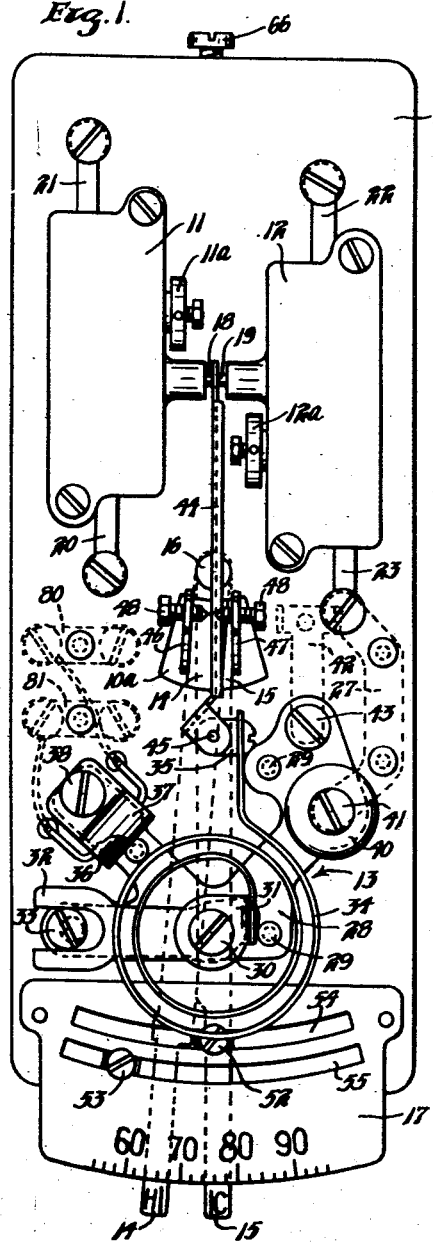
Inventor
EARL F. DIEKHOFF
By
George H. Fisher
Attorney June 26, 1951  E. F. DIEKHOFF  2,558,610
CONTROL DEVICE
Filed June 7, 1947 2 Sheets-Sheet 2
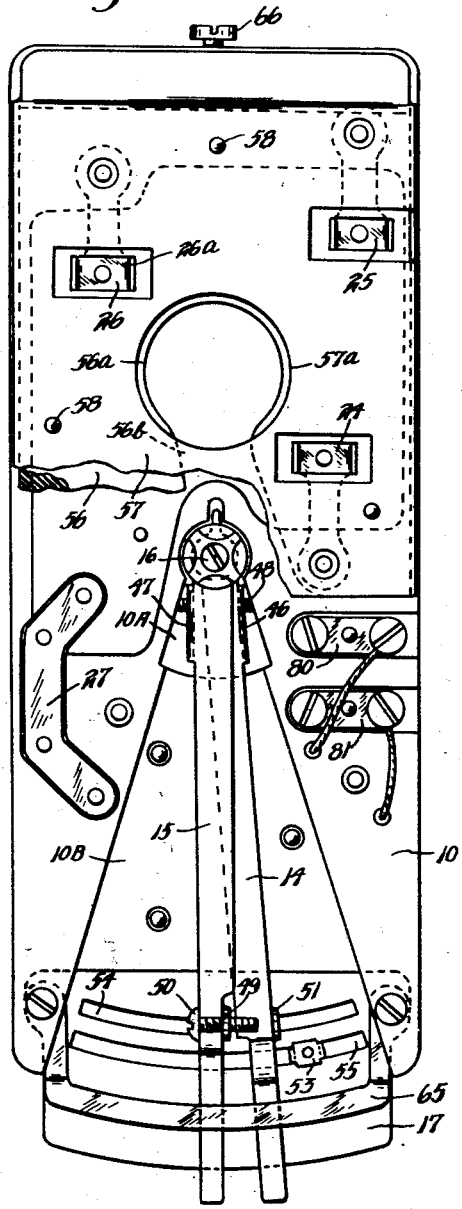
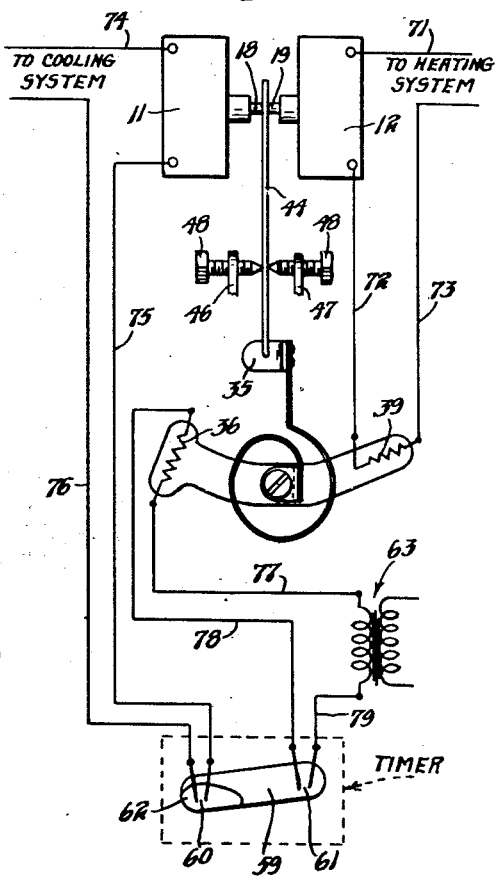
Inventor
EARL F. DIEKHOFF
George H. Fisher
Attorney Patented June 26, 1951

2,558,610

UNITED STATES PATENT OFFICE 2,558,610

CONTROL DEVICE

Earl F. Diekhoff, Minneapolis, Minn., assignor to Minneapolis-Honeywell Regulator Company, Minneapolis, Minn., a corporation of Delaware Application June 7, 1947, Serial No. 753,256

3 Claims. (Cl. 200—138)

This invention relates to a heating-cooling system, and to a control device that is adapted to control the operation of two separate systems and, more particularly, a cooling system and a heating system.

In modern air conditioned homes, there is provided both a heating plant and a cooling plant which may be entirely separate from each other or which may be a combination of the two units. In either arrangement, however, a control device is provided to bring the heating plant into operation when the temperature has fallen to a certain level and to bring the cooling plant into operation when the temperature has risen to another level.

In a control device of this nature, it is desirable to provide a certain minimum differential adjustment that provides for a minimum temperature differential between the temperature at which the cooling system stops operating and the temperature at which the heating system stops operating. Heretofore, mechanisms for providing this desired differential adjustment have been quite complicated, expensive, and not fully satisfactory. One of said prior art differential adjustments may be seen in the patent issued to Judson on October 13, 1942, Patent No. 2,298,795.

Also, the need for simple and reliable means for automatically lowering the operating temperature of the heating system during the night has long been present, but until now, has been unsatisfied. Heretofore, heaters, adapted to be put into operation to artificially heat a temperature responsive element of a heating-cooling control device, have been used to provide lower room temperature control at night, but these heaters are unsatisfactory unless means is provided to prevent the cooling system from operating at least until the room temperature has dropped enough to offset part of the temperature rise due to the heater.

The main object of this invention is to provide a simple, low cost, and dependable control device of the type described that satisfies the above mentioned needs.

A further object of the invention is to provide a very simple but highly efficient and easily adjustable mechanism for varying the differential adjustment as well as the operating ranges of the heating and cooling controls of the said device.

A still further object of the invention is to provide a control device that utilizes only one condition responsive means to operate separate control means with provision for independently adjusting the condition value at which each of said control means is actuated.

Further objects and advantages of my invention will become apparent from the following detailed description and the accompanying drawing wherein:

Figure 1 is an elevational view of the control device with its cover removed;

Figure 2 is a side elevational view of the control device with parts shown in cross-section and parts broken away;

Figure 3 is a back elevational view of the control device showing part of the mounting plate broken away; and Figure 4 is a schematic showing of the operating relationship of the control elements of the control device.

Referring now to the drawings, and more particularly to Figure 1 thereof, there is disclosed at 10 a base plate on which is mounted two oppositely disposed snap switches 11 and 12 controlling the cooling and heating systems, respectively. These snap switches, the internal details of which form no part of this invention, have differential adjusting means 11a and 12a, respectively, and actuating plungers 18 and 19 that actuate the snap switches to their "on" position upon moving inwardly. By rotating the members 11a and 12a, the number of degrees or fractions thereof, between which the switches move to their "on" and "off" positions, can be varied. The cut-out temperature point remains fixed but the cut-in temperature point is varied by this adjustment. Conductor strips 20 and 21 and 22 and 23 are terminals on the switches 11 and 12, respectively, which are connected by means of conductor bolts to lead terminal members 24, 25 and 26 and connector bar 27, respectively (see Figure 3).

The temperature responsive device, generally designated by the numeral 13, comprises a heat-conducting and element-supporting metal plate 28, suitably secured to the base plate 10, as by rivets 29. Pivotally mounted on the plate 28 by means of a pivot screw 30 is a bracket member 31 having a laterally extending bifurcated arm 32 which is in heat conducting contact with the plate 28. A bolt having an eccentric head 33 is screw threaded into the plate 28 with the head 33 positioned between the spaced portions of the bifurcated arm 32. Rotation of the head 33 will obviously rotate the member 31 on pivot 30 for a purpose hereinafter described. Secured at its inner end to the bracket 31 is a coiled bimetallic element 34, the outer free end of which carries a pivot member 35 having spaced bearings. A floating lever 44, having one of its ends positioned between plungers 18 and 19, has spaced bearing members at its other end which are adapted to align with the bearings on the member 35 and to be pivotally secured thereto by means of pivot 45. A night set-back heating element 36 is secured by means of a clamp 37 and screw 38 in heat-transferring relationship to the plate 28. Also mounted on plate 28, in heat-transferring relationship therewith, is a well known heat anticipating, carbon-block type of heater 39 that is clamped to said plate by means of a cap 40 and bolt 41. The bolt 41 passes through the cap 40, and an insulated opening through the heater 39, through an enlarged opening in the plate 28, through the base plate 10, and is screw threaded into the conductor bar 27. A lead terminal 42 (see Figure 1) is positioned behind the base plate 10 and is electrically connected to the plate 28 by means of bolt 43.

Pivoted on a common pivot 16 on the base 10 and positioned in a recess 10B in the back side of the base 10, are two adjustable levers 14 and 15. Extending laterally from the pivoted levers 14 and 15 a short distance from the pivot 16, are ears 46 and 47 respectively, which extend through an aperture 10A in the base plate 10. Screw threaded through the ears 46 and 47 are pointed screws 48 which are disposed in opposed relationship to one another on opposite sides of the floating lever 44 and serve as pivots or fulcrums for the lever 44. The lever 14 carries on the bottom end thereof the letter H and a pointer mark (Figure 3) which is adapted to cooperate with the indicia on a plate 17, suitably secured to the bottom of the base 10, to indicate the setting of said lever. This lever adjusts the setting of the pivot which serves as a fulcrum when the bimetal is forcing the lever 44 against plunger 19. The lever 15 is similarly marked at its lower end with the letter C and adjusts the pivot controlling actuation of plunger 18. The lever 15 has a rearwardly extending ear 49 thereon through which is threaded a screw 50. A similar ear 51 on the lever 14 is adapted to be engaged by the end of the screw 50 to maintain a minimum angular spacing therebetween. Suitable adjustable stops 52 and 53 mounted in slots 54 and 55, respectively, in plate 17, are adapted to limit the high temperature setting of the lever 14 and the low temperature setting of the lever 15, respectively.

Due to the short distance between the pivot 16 and the spaced pivot or fulcrum screws 48, a small amount of friction between the levers 14 and 15 and the pivot 16 is sufficient to maintain said levers in the adjusted position. Also, by using snap switches that have individual differential adjusting means, along with the adjustment provided by the screws 48, a very accurate and easily calibrated control device is provided. The screws 48 obviously enable one to properly position their pivot tips with respect to the lever 44 so as to cause actuation of switches 11 and 12 according to the setting of the levers 14 and 15 with respect to the scale on plate 17.

As can be seen in Figures 2 and 3, all of the lead terminal members 24, 25, 26 and 42 are secured to a plate 56 of insulating material by spreading ears thereon, like those shown at 26a in Figures 2 and 3, against the side walls of apertures in said plate 56. The plate in turn is secured to a metal mounting plate 57 by any suitable means, such as rivets 58. The plate 57 is adapted to be secured to a wall by any suitable means, as for example, by screws passing through holes (not shown) in said plate. Plate 56 has an opening 56a and a channel 56b adapted to permit passage of lead wires to the various terminals.

Plate 57 has an opening 57a adapted to be positioned over a hole in a wall, where the device is to be mounted, to permit lead wires to enter the device from said wall. With the plate secured to the wall, and the lead wires passing therethrough and secured to the proper lead terminals, the base plate 10 is then secured to the plate 57 by conductor screws electrically connecting terminals 20, 21, 22 and plate 28 with lead terminals 24, 25, 26 and 42, respectively. The case 67 is then slipped over the base 10 and fastened thereon by screw 66.

In Figure 4 of the drawing, there is shown a mercury switch having two pairs of contacts 60 and 61 and a mercury bubble 62. The contacts 61 of the mercury switch are in series with the heater 36 and a transformer 63, while the contacts 60 are in series with the snap switch 11. The timer, the details of which form no part of this invention, is only shown schematically in the drawing and is preferably positioned at a remote location with respect to the rest of the control device. However, it could be built into the control device or mounted adjacent thereto. This timer is adapted to tilt the mercury switch so as to bring the mercury bubble into engagement with contacts 61 every night and to again tilt the mercury switch to move the mercury bubble into engagement with contacts 60 every morning. It is thus seen that the cooling system cannot operate so long as the mercury bubble is in engagement with the contacts 61.

As best seen in Figure 2, a cover 64 having openings at the top and bottom thereof for the circulation of air therethrough, also has an opening in the bottom thereof which permits plate 17, a guide bar 65, and levers 14 and 15 to extend therethrough, and an opening at the top thereof through which a cover clamping screw 66 extends. Secured to the back or inside of the wall 67 of the cover, by means of a bracket 68, is a thermometer 69 which is visible through a slot 70 in the cover 67.

Should recalibration of the bimetal ever be necessary, it is accomplished by rotating the eccentric head 33 to reposition the inner end of the bimetal. The recalibration of the indicating and adjusting levers 14 and 15 to the temperature indicating indicia on the plate 17, is accomplished by adjusting the pivot screws 48.

*Operation*

With the above described device installed as illustrated in Figure 4, the lever 14 is first positioned with respect to the scale plate 17 at the temperature setting above which the room temperature should not be raised by the heating system. The lever 15 is then adjusted to a setting below which the room temperature should not be lowered by the cooling system. These adjustments will therefore establish a temperature range within which the heating and cooling plants will maintain the room.

Assuming that the temperature of the room in which the control device is located is 70 degrees Fahrenheit, and that the arms 14 and 15 have been adjusted as shown in Figure 1, it is apparent that the plungers 18 and 19 of the switches 11 and 12 will be in their "off" position with neither the heating nor the cooling system in operation.

Now assuming that the temperature of the room has dropped below 67° F. to the cut in temperature of switch 12, bimetal 34 will have cooled and contracted to the position where the lever 44 has pivoted on pivot 45 on the bimetal and about pivot screw 48 on lever 14 to move plunger 19 to its switch-on position. A circuit will then be completed from one lead to the heating system, through line 71, switch 12, line 72, heater 39, and line 73 back to the other lead to the heating system. The heating system will then bring the temperature of the room up to the setting of the lever 14, that is, to a temperature of 67° before the switch 12 is again opened. During this heating cycle, the heater 39 acts as an anticipator to prevent overshooting of the room temperature. This use of a heat anticipator per se is not new in the art.

Now, assuming that the temperature of the room has risen to the cut-in temperature of switch 11, a temperature above the setting of the lever 15, the bimetal 34 will have expanded to a position where the lever 44 has pivoted about the pivot screw 48 on lever 15 to move plunger 18 to its switch-on position. This will complete a circuit from one side of the cooling system through line 74, switch 11, line 75, contact 60 and line 76 back to the other side of the cooling system. The cooling system will then stay in operation until the temperature of the room has dropped to the setting of lever 15.

Now assume that the timer has actuated the mercury switch 59 to the position where contacts 61 are bridged by the mercury bubble 62. The circuit will then be completed from one side of the transformer 63 through line 77, heater 36, line 78, contact 61, and line 79 back to the other side of transformer 63. Assuming that the heater 36 is arbitrarily selected to artificially heat the bimetal 10°, by the heat passing from the heater through plate 28 and bracket 31 to bimetal 34, it is obvious that the bimetal will not actuate plunger 19 to its switch closed position until the room temperature has lowered to a temperature 10° below the setting of lever 14, that is, 57°. The heating system will then tend to maintain a room temperature of 57° during the night and will automatically bring the room temperature up to the setting of the lever 14, that is, 67°, when the timer breaks the contact 61 in the morning.

It is to be noted that except for the fact that the circuit to the cooling system is broken at contact 60 upon the timer moving the switch 59 to close contact 61, the heater 36 would raise the temperature of the bimetal to a temperature that would cause the cooling system to go into operation before the room temperature has lowered sufficiently to compensate for this artificial heating of the bimetal. This is possible even though there is an adjusted differential of 8°, and possibly an even lower minimum differential determined by the stops 50 and 51, between the heating-system-on temperature and the cooling-system-on temperature. The switch 60 therefore prevents an unnecessary operation of the cooling system.

As various modifications of the invention will be apparent to those skilled in the art, upon reading the foregoing description of the invention, it is to be understood that the scope of the invention is not to be determined by the above disclosure, but only by the appended claims.

I claim:

1. In a thermostat, a base, a bimetal element having one portion secured to said base and a second portion movable with respect thereto on change in temperature, a lever supported by the second portion of said element by a pivotal connection therebetween, first and second switches mounted on said base and having actuators disposed on opposite sides of a portion of said lever remote from the pivotal connection to said element, first and second fulcrums disposed adjacent opposite sides of a third portion of said lever, means for positioning each of said fulcrums toward and away from said lever, and cooperating indicia of temperature on said base and on said means for indicating the temperature at which said element will actuate each of said switches.

2. In a thermostat, a base, a bimetal element having one portion secured to said base and a second portion movable with respect thereto on change in temperature, a lever supported by a second portion of said element by a pivotal connection therebetween, first and second switches mounted on said base and having actuators disposed on opposite sides of a portion of said lever remote from the pivotal connection to said element, first and second fulcrums disposed adjacent opposite sides of a third portion of said lever, first and second members carrying said fulcrums and pivoted in said base, a scale comprising indicia of temperature on said base, pointers on each of said members cooperating with said scale and indicating the temperature at which each of said switches will be actuated, and cooperating means on said members establishing a minimum temperature difference between the setting of said pointers.

3. In a condition controlling device, a base, a condition responsive element having one portion secured to said base and a second portion movable with respect thereto on condition change, a lever supported by the second portion of said element by a pivotal connection therebetween, first and second control elements mounted on said base and having actuators disposed on opposite sides of a portion of said lever remote from the pivotal connection to said element, first and second fulcrums disposed adjacent opposite sides of a third portion of said lever, means for positioning each of said fulcrums toward and away from said lever, and cooperating indicia of condition value on said base and on said means for indicating the value of the condition at which said condition responsive element will actuate each of said control elements.

EARL F. DIEKHOFF.

REFERENCES CITED

The following references are of record in the file of this patent:

UNITED STATES PATENTS

| Number | Name | Date |
| --- | --- | --- |
| 2,043,441 | McCabe | June 9, 1936 |
| 2,210,922 | Joesting | Aug. 13, 1940 |
| 2,283,374 | Kronmiller | May 19, 1942 |
| 2,291,501 | Persons | July 28, 1942 |
| 2,309,193 | Holmes | Jan. 26, 1943 |
| 2,344,535 | Clark | Mar. 21, 1944 |
| 2,377,503 | Kronmiller | June 5, 1945 |
| 2,402,435 | Newton | June 18, 1946 |
| 2,403,798 | Holmes | July 9, 1946 |